Nov. 11, 1952 H. O. ANGER 2,617,883

CIRCUIT FOR INCREASING DURATION OF PULSES

Filed Dec. 10, 1945

INVENTOR
HAL O. ANGER

BY *William D. Hall*

ATTORNEY

Patented Nov. 11, 1952

2,617,883

UNITED STATES PATENT OFFICE 2,617,883

CIRCUIT FOR INCREASING DURATION OF PULSES

Hal O. Anger, Long Beach, Calif., assignor to the United States of America as represented by the Secretary of War Application December 10, 1945, Serial No. 634,094

1 Claim. (Cl. 178—44)

This invention relates to a transmission circuit and, more particularly, to a circuit for increasing the duration of an electrical pulse, for example, of the square-wave type.

An object of the invention is to increase, and preferably, to double the length or duration of a given electrical pulse.

A feature of the invention comprises increasing the duration of an electrical pulse by use of a transmission circuit or network including transmission delay means.

Another feature comprises proportioning the transmission delay means embodied in the aforesaid transmission circuit or network, such that its electrical length is equivalent to the length of the pulse applied to the input of the circuit.

A further feature comprises lengthening or increasing the duration of the sweep on the train and elevation matching oscilloscopes as an anti-jamming measure in radio object locating systems by including the pulse transmission delay arrangement of the invention therein.

In general, the invention may be embodied in a circuit or network comprising input terminals and output terminals common to a plurality of, or, more specifically, two transmission paths of dissimilar transmission characteristics. One path enables or provides for direct transmission between the input and output terminals of the circuit of the electrical pulse applied to the input terminals. The other path introduces transmission delay, or retards, relative to transmission over the first path, the transmission of the electrical pulse applied to the input terminals, such that the pulse arriving over the second path is effective at the output terminals immediately consecutive to the pulse arriving thereat over the first path. If the transmission delay-introducing path is proportioned so that its electrical length is equivalent to that of the length or duration of the pulse applied to the input terminals, the pulse effective at the output terminals will be of twice the length or duration of the initial pulse.

More specifically, the invention may be embodied in radio object locating systems where it may be desirable to lengthen the duration of the sweep on the train and elevation matching cathode ray oscilloscopes as an anti-jamming measure. The sweep length may be controlled by the length of the range notch pulse which is applied to the oscilloscopes.

A more detailed description of the invention and certain illustrative embodiments follows hereinafter, with reference to the appended drawing, wherein.

Figure 1:
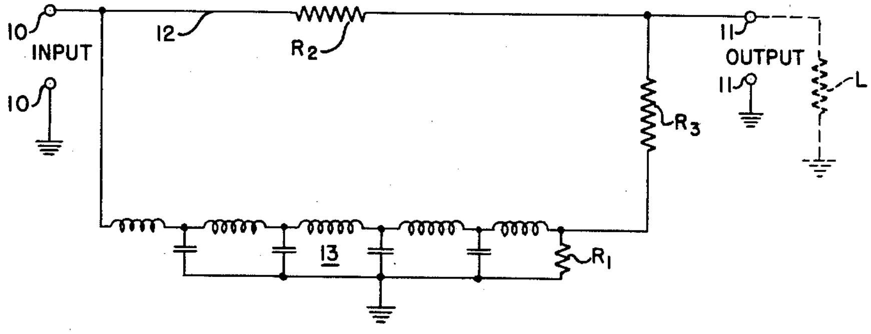
Fig. 1 shows a circuit configuration for practicing the invention.

The pulse-lengthening circuit arrangement of Fig. 1 comprises input terminals 10, 10, output terminals 11, 11 across which a load L may be connected, a series resistor $R_2$ in line 12, and a series resistor $R_3$ in circuit with artificial delay line or network 13 terminated in its characteristic impedance by resistor $R_1$. The electrical length of the artificial line should be proportioned to be equivalent in length to the length or duration of the pulse to be applied to the input terminals 10, 10.

A pulse applied to input terminals 10, 10 is presented with two transmission paths to the output terminals 11, 11, one through the resistor $R_2$, the other through the artificial line or delay network 13 and resistor $R_3$. The signal transmitted through the delay line is retarded in time equal to the duration of the applied pulse. Hence the pulse or signal appearing or effective at the output terminals will be of twice the length or duration of the applied pulse.

Figure 2:
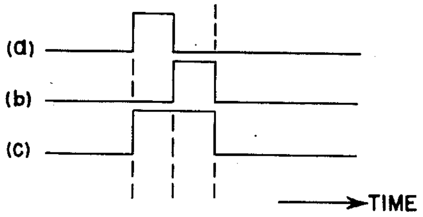
Fig. 2 shows representations of electrical pulses, for explaining the mode of operation of the arrangement of Fig. 1.

In Fig. 2, *a* illustrates the applied pulse, which may be of square-wave type, *b* illustrates the delayed pulse derived over the delay transmission path, and *c* illustrates the combined or doubled-duration pulse effective at the output terminals 11, 11, that is the square waves effective at the output terminal are immediately consecutive.

Figure 3:
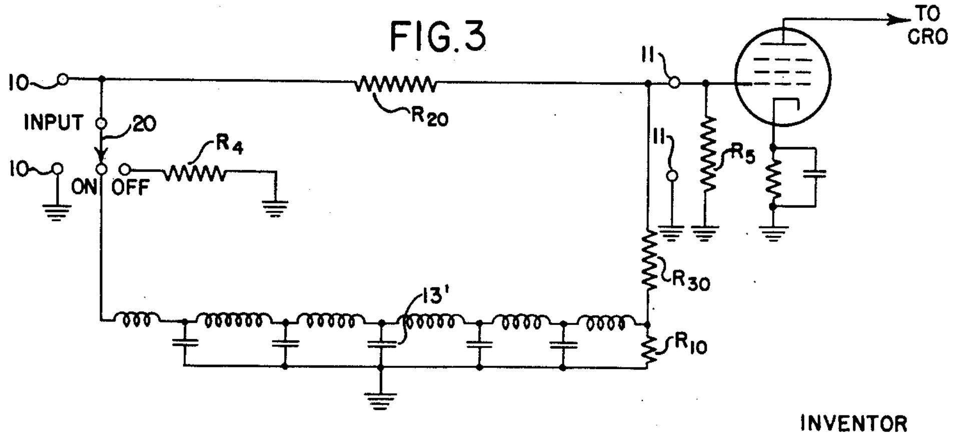
Fig. 3 shows a circuit configuration for applying the invention to radio object locating systems.

Fig. 3 shows a modification of the circuit arrangement of Fig. 1 adapted for use in a radio object locating system when it may be desirable to lengthen the duration of the sweep on the train and elevation matching cathode ray oscilloscopes as an anti-jamming measure. The sweep length may be controlled by the duration or length of the range notch pulse which is applied to the oscilloscopes. Resistors $R_{10}$, $R_{20}$, $R_{30}$ and delay line or network 13' of Fig. 3 correspond in functions to components $R_1$, $R_2$, $R_3$ and 13 of Fig. 1. In operation, the original range notch pulse is applied to the input of the circuit, and follows the two transmission paths provided, one through $R_{20}$, the other through the network 13', to be combined as described with reference to Figs. 1 and 2 at the common output of the two paths and applied for example, to a control electrode, specifically, the input grid, of an electronic stage intermediate the pulse lengthening circuit and the oscilloscopes. The arrangement of Fig. 3 may include an on-off switch 20 to enable returning the input pulse to its initial or original duration when desired. The switch 20 is shown in "on" position. When the switch is adjusted to its "off" position, a suitably proportioned terminating resistor $R_4$ is connected across the input terminals. In one embodiment constructed in accordance with the invention, the resistive components of Fig. 3 had the following values: $R_{10}$—300 ohms; $R_{20}$—2200 ohms; $R_{30}$—2200 ohms; $R_4$—300 ohms; $R_5$—2000 ohms.

As already indicated, the invention may be embodied in a video pulse circuit as a means of increasing, specifically, doubling, the length or duration of a given pulse without the use of additional electronic devices in the circuit, and may be embodied in a radio object locating system, and more specifically, the receiver circuit thereof, as a means of increasing, specifically, doubling, the length or duration of the range notch pulse as an anti-jamming measure or expedient.

Although the invention has been disclosed with reference to certain specific embodiments, obvious modifications and applications will readily occur to those skilled in the art, and it is evident, therefore, that the scope of the invention shall not be limited thereto.

What is claimed is:

Apparatus for selectively deriving, from a first series of spaced square wave voltage pulses each having the same duration and being separated from one another by more than twice said duration, a second or a third series of spaced square wave pulses, comprising: first, second and third impedance circuits, each of said circuits respectively having input and output ends, the input end of said first circuit having said first pulse series applied thereto, said second circuit including delay line means having a given characteristic impedance for providing a delay equal to the duration of each of the pulses in said first series, said third impedance circuit including energy dissipation means having an impedance equal to said characteristic impedance; load means connected to the output ends of both said first and second circuits; and switch means connected to the input end of said first circuit for selectively connecting thereto the input ends of either said second or third circuits to selectively apply to said load means either a second series of pulses each having a given amplitude and a duration twice that of a pulse from said first series when the input end of said second circuit is connected to the input end of said first circuit, or to apply to said load means a third series of pulses each having a duration equal to that of each pulse of said first series of pulses and an amplitude equal to that of said second series of pulses when the input end of said third circuit is connected to the input end of said first circuit.

HAL O. ANGER.

REFERENCES CITED

The following references are of record in the file of this patent:

UNITED STATES PATENTS

| Number | Name | Date |
|---|---|---|
| 2,145,332 | Bedford | Jan. 31, 1939 |
| 2,211,942 | White | Aug. 20, 1940 |
| 2,382,413 | Hanert | Aug. 14, 1945 |
| 2,412,994 | Lehmann | Dec. 24, 1946 |
| 2,448,635 | Smith | Sept. 7, 1948 |
| 2,457,559 | Huber | Dec. 28, 1948 |